Nov. 1, 1966     J. H. RISEMAN ET AL     3,282,817
GLASS ELECTRODE AND METHOD OF MAKING THE SAME
Filed Feb. 20, 1963
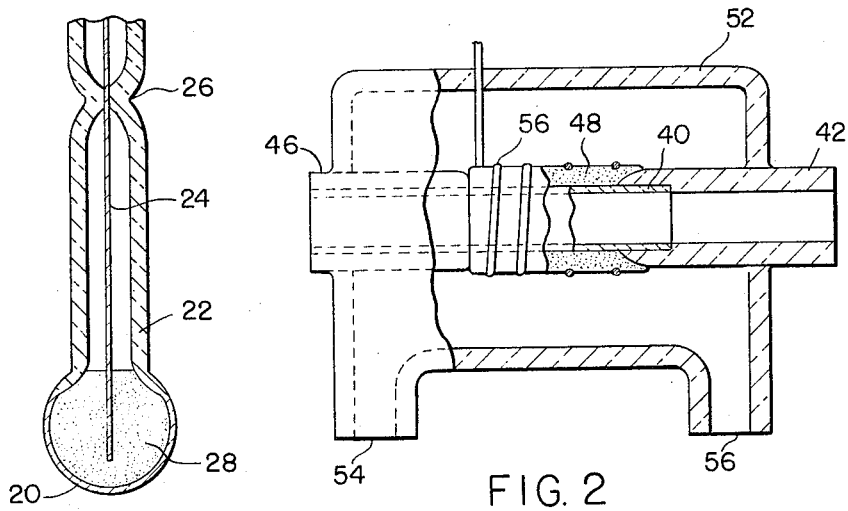
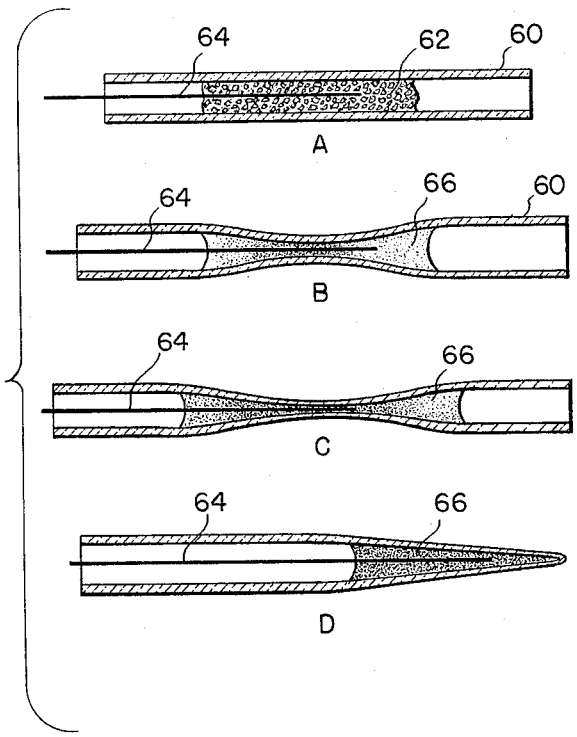
INVENTORS
JOHN H. RISEMAN
JAMES W. ROSS
BY ROBERT A. WALL
Rosen & Schiller
ATTORNEY

United States Patent Office 3,282,817
Patented Nov. 1, 1966

3,282,817
GLASS ELECTRODE AND METHOD OF
MAKING THE SAME
John H. Riseman, Cambridge, James W. Ross, Newton, and Robert A. Wall, Wakefield, Mass., assignors to Corning Glass Works, Corning, N.Y., a corporation of New York
Filed Feb. 20, 1963, Ser. No. 259,947
10 Claims. (Cl. 204—195)

This invention relates to electro-chemical devices, and more particularly, to improved glass electrode structures for the determination of ion concentration.

Glass electrode structures are now widely used for the determination and measurement of concentration of various ions in solutions, replacing for many applications, sundry other analytical methods. Particularly, such electrode structures are useful in the determination of the concentration of such ions as hydrogen, sodium, potassium, ammonium and the like. As commonly used in the art, such electrode structures usually incorporate a thin membrane of ion-sensitive glass, one surface of the membrane being intended to contact the solution which it is desired to test, the other surface of the membrane being in contact with an electrically conducting medium of known constant reference characteristics. Upon contacting the test solution, a potential arises across the membrane from surface to surface and is a function of the concentration of ions in the test solution. The composition of the glass used in forming the membrane may be selected so as to exhibit a preferential sensitivity to one ionic species. By measuring the potential, the ion concentration in the external solution under test is then determined. The auxiliary apparatus, which includes among other elements, the requisite electrical measuring apparatus, reference electrodes and the like, and processes for using glass electrodes of the ion-sensitive type, are all well delineated in the prior art and need not be described here.

Because, even with so-called "low resistance" glasses which exhibit substantial ion sensitivity, the resistivity of the glass is in the order of $1 \times 10^{10}$ ohms-cm., the measurement of potential is usually accomplished by potentiometric means, or other device which can measure a potential despite an extremely high source impedance. Hence, the usual practice is to form the membrane, for instance, as a bulbous structure which is extremely thin. As a reference medium, the prior art generally teaches the use of an electrolyte solution, such as a carefully determined quantity of HCl in water. A metallic, electrically-conducting lead is immersed in the reference solution in order to provide the requisite electrical connection thereto.

While such electrode structures measure ion concentrations, such as pH, rapidly and accurately, and are particularly well adapted for continuous measurement and therefore process control, within the present state of the art their usage poses several problems, some being of long standing. For one thing, the glass electrodes are subject to failure because of their inherent fragility arising out of the necessary thinness of the membrane.

Typically, electrodes of this type also exhibit immersion sensitivity; i.e.—the potential across the membrane will vary according to the extent that the surfaces of the membrane are in partial contact with the respective test and reference solutions. Because the reference solution exhibits a partial pressure and volumetric variations, both of which are thermally responsive, it is necessary in the construction of such electrodes to provide expansion space contiguous with the volume occupied by the reference solution. Hence, the reference solution is not completely confined and the electrode structure will exhibit immersion sensitivity variations with changes in spatial orientation or position.

Yet another problem arises out of the use of aqueous reference solutions with respect to which the glass may or may not be stable in the sense of long-term solubility.

Electrodes of the type described do not lend themselves readily to the construction of micro-electrodes adapted for use within highly confined areas such as blood vessels. In micro-electrode technology particularly, all of the foregoing problems are compounded because of the minute size of the electrode; and further added is the extreme difficulty experienced in placing an aqueous reference electrolyte into the necessary minute interior of a capillary tube. The same considerations are equally applicable to the use of electrolytes such as hydrated gels which would decompose and vaporize at the temperatures at which the ion-sensitive glass can be worked.

It is, therefore, a principal object of the present invention to provide an improved ion-concentration measuring electrode structure which is characterized particularly by its ease of manufacture, insensitivity to positional changes, improved mechanical qualities such as resistance to breakage, and by its versatility in the variety of forms and sizes in which it can be constructed. In addition, such electrode exhibits superior electrical properties in terms of stability of the internal reference material and consequent reduced drift over extremely long periods of time.

Other objects of the present invention will in part appear obvious and will in part appear hereinafter. The invention accordingly comprises the processes involving the several steps and the relation of one or more such steps with respect to each of the others, and the apparatus possessing the construction, combination of elements and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

FIGURE 1 is a schematic cross-section of a typical glass electrode structure embodying the principles of the present invention;

FIGURE 2 is a schematic diagram partly broken away and partly in cross-section of yet another embodiment of a glass electrode structure employing the principles of the present invention; and FIGURE 3 is a schematic diagram showing several exemplary steps in the manufacture of a micro-electrode embodying the principles of the present invention.

Generally, to achieve the foregoing objects, the present invention comprises a glass electrode structure including a membrane of ion-sensitive glass adapted to have one surface thereof placed in contact with a test solution, the ion concentration of which it is desired to measure. In order to couple a measuring device to any potential existing across the glass membrane, there is provided the usual metallic, electrically-conductive electrode. Means are provided for electrically connecting the electrode to the other surface of the glass membrane. In the present invention, the last named means is formed as a substantially integral mass of a solid, electrically conductive, fused crystalline material in intimate contact with both the electrode and the other surface of the membrane. Such material is selected from the group of materials which will allow, when in such contact, electronic charge transfer between the electrode and the crystalline mass in both directions with negligible polarization potential—i.e.—a polarization potential which remains substantially constant over an extended period of time, for instance within ±0.1 millivolts for ten hours, and will also allow ionic transfer between the mass and the other surface of the membrane, also with negligible polarization potential.

Referring now to FIGURE 1, there will be seen an embodiment of an exemplary electrode structure formed according to the principles of the invention, which structure includes an ion-sensitive membrane 20 formed as a globule or bulb enclosing one end of a hollow, tubular, glass stem 22. Membrane 20 is preferably extremely thin, and may be for example, in the order of a micron in thickness. Membrane 20 can be formed from one of a large number of known ion-sensitive glass compositions. For example, membrane 20 may be a so-called lithia pH glass such as is described in U.S. Patent 2,462,843 issued March 1, 1949, to H. Cary et al. Other pH responsive glass compositions are known and described, for example—in U.S. Patents No. 2,497,235 issued February 14, 1950, to G. A. Perley; No. 3,025,174 issued March 13, 1962, to W. Simon; No. 2,668,143 issued February 2, 1954, to P. T. Gilbert, Jr. et al.; and others. A pNa responsive glass is described in U.S. Patent No. 2,829,090 issued April 1, 1958, to G. Eisenman et al.; and pK responsive glass is described in U.S. Patent No. 3,041,252 issued June 26, 1962, to G. Eisenman et al. All of the foregoing glasses are so-called low-resistivity glasses having resistive values in the order of $10^9$ to $10^{10}$ ohms-cm. Stem 22, as well known in the art, is preferably a standard high-resistivity glass, i.e.—having a specific resistivity in the order of $1 \times 10^{14}$ to $10^{15}$ or more ohms-cm. In order to insure that the bond between the glass membrane and the stem remains comparatively temperature stable, it is preferred that the glass composition chosen for stem 22 has substantially the same thermal coefficient of expansion as the glass of membrane 20 over the temperature range in which it is desired to operate the electrode structure.

The embodiment of FIGURE 1 also includes a metallic, electrically conductive electrode or lead 24 which is disposed interiorly of stem 22 and extends within the interior of the globular configuration of membrane 20. Lead 24 is, at least in part, preferably held within stem 22 and hermetically sealed therein by a constriction 26 in stem 22. While the difficulties of achieving a thermally stable glass-to-metal bond are appreciated, known structures and methods may be used to achieve such bond, as for instance by providing that portion of lead 24 about which construction 26 is formed, of a metallic substance, such as Dumet, which possesses substantially the same thermal coefficient of expansion as the glass.

Disposed within the globular form of membrane 20 and in intimate physical contact with the interior surface of membrane 20 is an integral, homogenous, electrically conductive, normally solid mass 28, in which a portion of lead 24 is so embedded as to be also in intimate physical contact therewith.

The embodiment of FIGURE 1 is preferably formed as follows. A tubular glass-stem 22 is selected with the requisite physical characteristics. One end of the tube is dipped in a melt of the desired ion-sensitive glass composition and a bubble is blown and formed at the one end of stem 22, thereby sealing that end with a globular chamber. In order to provide the solid electrolytic mass 28, there is selected a normally solid (i.e.—under standard conditions of temperature and pressure) substance which is electrically conductive as a solid, is capable of being in a molten state within a temperature range at which the glass composition forming the membrane 20 will be soft enough to allow for rearrangement of the silica lattice thereof, exhibits a normally low volume electrical resistivity which is preferably at least an order of magnitude less than the bulk resistivity of the glass membrane employed, and which possesses, in its solid state, a mobile cation having a diffusion coefficient of the order of the diffusion coefficient of the normally mobile ions of the glass composition forming membrane 20. The use of substances having low mobility cations will generally create an undesirably polarizable region between the solid material and glass. Additionally, the material selected preferably should be capable of forming an integral solid mass when cooled from the molten state, which mass will tenaciously adhere to or bond with both membrane 20 and lead 24. A typical example of such material is silver chloride, although a variety of other materials may be employed. The silver chloride is heated to a temperature at which it will be molten without substantial decomposition, and at which glass membrane 20 will soften. Membrane 20 is also raised to such temperature (e.g.—about 550° C. if membrane 20 is formed of NAS 20–5 glass) and the molten silver chloride poured into the interior of the bulbous enclosure so as to completely cover membrane 20. Lead 24 is held, as by a jig, so that its free end is suspended within the enclosure during the introduction of the molten silver halide. Sufficient of the latter is employed to form an integral mass or bridge between the membrane and lead. Membrane 20 and the silver chloride mass 28 are held at the requisite temperature for a period of approximately thirty seconds (or even as short a time as one second at higher temperatures) to insure good formation of the glass-AgCl bond. The bond is believed to be formed thus as a transition region wherein the composition of the glass and AgCl are physically intermingled. Lead 24 in the example thus given, at least in that portion contacting the silver chloride mass, is preferably made of substantially pure silver, although platinum or other noble metals may be employed. The electrode structure is then cooled slowly and the molten silver chloride is allowed to solidify. To insure that the lead is not held within the electrode solely by its bond with the silver chloride mass, for example a portion of stem 22 is then heated and compressed about the lead to firmly hold it in place and relieve any strains which might disrupt the lead-mass bonding.

In the use of an electrode formed with the structure just described, it will be apparent that positional changes of an operating electrode will have no effect upon the potentials developed across the membrane. For instance, even if the electrode is turned upside down, the solid mass will remain in contact with the membrane, and charge-transfer through the mass-membrane transition region is not impaired. In prior art devices using liquid electrolytes, it is apparent that turning the electrode upside down will result in the flow of the electrolyte into the expansion space, frequently creating an immersion-sensitivity type of error; and if the expansion space is of sufficient size to allow the electrolyte to flow completely out of contact with the ion-sensitive membrane, the electrode will cease functioning.

The transition region created between the solid electrolyte and the glass by the manufacturing process heretofore described, provides a bond which clearly allows ionic transfer of mobile ions therethrough. Additionally, when using certain materials such as AgCl, this bond has been found to be extremely tenacious. Efforts have been made in the prior art to achieve good electrical contact through coating or plating the interior surface of a membrane with, for example, silver, and contacting the latter directly with a lead. However, charge transfer through silver is believed to be almost completely electronic. The polarization potential across a glass-silver junction is also believed to be less stable in time than the potential across either a transition region of the type attained by the process of the present invention, or at an Ag-AgCl junction. Also, evaporated silver films on glass are known to lack tenacity. Indeed, such evaporated silver coatings are actually used to provide an easy-parting plane in the molding of certain plastics. Further, electrode structures formed according to the principles of the present invention exhibit remarkable stability. For instance, an electrode structure of the present invention when immersed in a 0.1 N test solution of sodium chloride (the electrode being formed of an ion-sensitive glass of NAS 11–18 composition) showed a maximum variation of less than 0.2 millivolt in measuring a substantially constant potential of −143 millivolts over a period of four hours while at substantially constant temperature of 30° C.

An additional advantage of electrode structures formed according to the principles of the present invention lies in the fact that the electrolyte mass is substantially anhydrous. Many of the ion-sensitive glasses are hygroscopic and hence tend, in the presence of water, to form a hydration layer at the surface. Such hydration layers in effect are low resistance paths and will tend to spread. In an electrode structure wherein both the outside and inside surfaces of the membrane are in contact with moisture, the surface hydration layers will tend to creep toward one another, even under surface coatings placed upon the glass. Ultimately, such hydration layers will meet and effectively short-circuit the electrode. The use of a solid electrolyte as hereinbefore described, insures that no surface hydration will occur initially upon the interior of the membrane due to contact with the reference electrolyte. Hence, any hydrated surface formation which ultimately occurs must first arise on the exterior surface and migrate along a considerably lengthened path before short-circuiting can occur.

The electrode structure of the present invention can take other forms. For instance, another embodiment is shown in FIGURE 2 wherein a membrane of ion-sensitive glass is formed as a short length of hollow tubing 40 which is open at both ends. Sealed to the respective ends of the tube 40 are conduit means such as tubes 42 and 46 which respectively form ingress and egress means to the interior of tube 40. The exterior surface of tube 40 is covered or coated with a solid mass of electrically conductive crystalline material of the type heretofore described in connection with mass 28 of FIGURE 1. At least a part of an electrically conductive metallic electrode or lead 50 is imbedded in mass 48, as by being wrapped about mass 28, and one free end of lead 50 extends outwardly from the structure thus formed. The latter is encased, with the exception of the open ends of conduits 46 and 42, in a jacket or casing 52 which substantially surrounds tubes 46, 40 and 42, being in contact therewith adjacent the open ends of conduits 42 and 46 so as to form a sealed chamber having interior walls displaced from the tubular structure. Casing 52 is provided with inlet means such as opening 54 and exit means such as opening 56.

In the preferred form of FIGURE 2, conduits 42 and 46 are made of high-resistance glass, as is casing 52. The ends of conduits 42 and 46 connecting to tube 40, preferably overlap the exterior ends of the latter, and together with solid mass 48 constitute a covering over the entire exterior periphery of tube 40.

In operation, a test solution containing the ionic species which it is desired to measure is introduced into conduit 42. Because the dimensions of the conduits and tube 40 can be made very small, but a small sample is required to completely fill the interior of the tubular structure. Constant temperature operation of the device can be insured by flowing a supply of substantially fixed-temperature fluid into the opening 54 and out of opening 56 at a rate sufficient to insure that thermal equilibrium will be shortly reached between all of the interior elements of the electrode structure and the test sample. Typically, the regulating fluid can be an electrically insulating oil. It will be apparent to those skilled in the art that, where the regulating fluid is water, a thin coating of other material having reasonably good thermal-transfer and electrically insulating characteristics should be applied about the wire and the external periphery of the mass 48 for coating the latter and the wire embedded therein so as to prevent any possible contact between the mass and the thermoregulating fluid. Electrode structures formed as described exhibit most of the advantages of the structure of FIGURE 1. It will be apparent that in the structure of FIGURE 1 the existence of the solid mass within the interior of the bulbous form of membrane 20 provides a substantially rigid mechanical support which contributes greatly to the strength thereof and will minimize breakage. However, in the device disclosed in FIGURE 2, breakage of tubular membrane 40 is also minimized by the protection afforded by casing 52 as well as by the added mechanical strength of coated mass 48.

In forming the structure of FIGURE 2, particularly in the application of mass 48 to tube 40, the mass is preferably applied or coated as a molten material while the glass is in softened condition. The mass is maintained in a molten state and the glass at its softened temperature for a period of time, for example about five minutes. Following such period of time the coated tube is allowed to cool slowly. It has been found that if the tube of ion-sensitive glass is not at the elevated temperature during and shortly after the coating operation, the distribution of potential across the glass during operation will be non-uniform from point to point. However, by employing the process disclosed, such non-uniformity or asymmetry of potential is considerably reduced.

The principles of the present invention allow the formation of electrodes of sizes and shapes heretofore comparatively unattainable. For instance, referring to FIGURE 3, there will be seen exemplary steps in the process of forming a micro-electrode with the principles of the present invention. As will be seen in FIGURE 3A a tube 60 of ion-sensitive glass and having an internal diameter, for example, of 0.1 inch is packed with crystalline or granular material such as silver chloride 62. A very fine electrically-conductive lead such as silver wire 64 is inserted into the mass and held by means (not shown), such as a jig, out of contact with the tube. Heat is applied, preferably uniformly, to a limited portion of tube 60 in which both the crystalline silver chloride and the lead are located, as by rotating tube 60 about its lonigtudinal axis while applying heat at a fixed location. The application of sufficient heat will raise the temperature of the glass, causing it to soften, and simultaneously form molten silver chloride as at 66 in FIGURE 3B. As the glass softens and when the silver chloride has become molten, the tube is placed under tension directed along its longitudinal axis, thereby drawing out the tube progressively as shown in FIGURES 3B and 3C to form a capillary. The temperature of the tube should be regulated such that although the glass is softened to a working point, the temperature is maintained below a level at which the silver chloride will tend to decompose or vaporize. Thus a capillary is formed in which is disposed molten silver chloride surrounding a portion of the lead which is preferably coaxial with the capillary. When tube 60 has been drawn to a point at which the external and internal dimensions thereof are of desired size but still include a portion of the lead and the molten mass, the tension on the tube is released and the tube allowed to cool. The capillary may be severed and a glass bead formed at the severed end thereof simply by reapplying heat at a point on the capillary until the glass softens, and thereafter drawing the capillary very rapidly to break it. An electrode has been formed in this manner which has an external tip diameter of 10μ but which, nevertheless, contains the lead embedded in solid electrolyte which in turn is bonded to the glass, and thus functions well as an ion-sensitive electrode and is clearly suitable for insertion into limited spaces such as blood vessels or the like. It is apparent that it would be extremely difficult to form capillary or micro-electrodes of comparable size employing liquid reference electrolytes therein. To use a process similar to that described would simply result in vaporization of the internal electrolyte long before the glass reached a working temperature. On the other hand, the formation of the glass capillary first and the introduction of the liquid electrolyte at a later stage becomes virtually impossible in view of the extreme difficulty experienced in introducing aqueous solutions into extremely fine capillaries.

A number of electrode structures embodying the principles of the present invention were made and tested according to the following table. All of these structures use glass-membranes of the following composition: $Na_2O$—11.0%; $Al_2O_3$—18.0%; and $SiO_2$—71.0%. All were tested with a standard calomel reference electrode. For comparison purposes, an electrode of the same glass composition was also prepared using a liquid reference electrolyte (0.1 N HCl) with an Ag-AgCl lead. In the table, the first column captioned "mass" indicates the nature of the ionic fused material. The second and third columns captioned respectively "0.1 M" and "0.01 M" indicate the measured E.M.F. in millivolts for respective test solutions of 0.1 M NaCl and 0.01 M NaCl. The last column indicates the measured difference between determinations set out in the second and third columns. It should be noted that theoretical difference in potential between two test soltuions is 56–57 millivolts. All measurements were taken at room temperature.

| Mass | 0.1 M | 0.01 M | ΔE.M.F. |
|---|---|---|---|
| AgCl | −143 | −201 | 58 |
| AgBr | −345 | −403 | 58 |
| TlCl | +143 | +86 | 57 |
| TlI | +477 | +424 | 53 |
| $AgNO^3$ | +296 | +241 | 55 |

The comparison electrode using a liquid electrolyte showed an E.M.F. for the test solution of 0.1 M NaCl of −18 millivolts and, for the test solution of 0.01 M NaCl, −74 millivolts, a ΔE.M.F. of 56. All of the measurements using fused ionic masses came to equilibrium within two minutes. The first three showed remarkable freedom from drift, exhibiting drifts of less than 0.2 millivolts in runs in excess of four hours. In all cases no changes in sensitivity were observed due to alterations in electrode orientation with respect to the test solutions.

Since certain changes may be made in the above apparatus and method without departing from the scope of the invention herein involved, it is intended that all matter contained in the above description or shown in the accompanying drawing shall be interpreted as illustrative and not in a limiting sense.

What is claimed is:

1. An electrode structure for measuring concentration of an ionic species in aqueous solution, said structure comprising, in combination:
    a membrane of glass sensitive to said ionic species in said aqueous solution;
    a metallic, electrically-conductive lead, said lead being selected from the metal from which said salt is derived or a noble metal; and
    a solid, fused, electrically-conductive, crystalline, substantially integral mass selected from the salts of silver and thallium, and in intimate physical and electrical contact with both said lead and one surface of said membrane.

2. An electrode structure for measuring concentration of an ionic species in aqueous solution, said structure comprising, in combination:
    a substantially hollow, thin wall chamber having at least a wall portion thereof formed of glass sensitive to said ionic species in said aqueous solution;
    an electrically-conductive, metallic lead disposed within and spaced from the walls of said chamber; and
    a solid fused mass of an ionic material selected from the salts of silver and thallium, and disposed within said chamber for completely covering the interior surface of said wall portion and being in intimate physical and electrical contact with said surface and with said lead, said lead being selected from the metal from which said salt is derived or a noble metal.

3. An electrode structure for measuring concentration of an ionic species in aqueous solution, said structure comprising, in combination:
    a substantially hollow thin-walled chamber having at least a wall portion thereof formed of glass sensitive to said ionic species in said aqueous solution;
    a metallic, electrically-conductive lead disposed exteriorly of said chamber and in spaced relation thereto; and
    a solid fused mass of an ionic material selected from the salts of silver and thallium, and coated about the external periphery of said chamber so as to completely cover the outer surface of said wall portion and being in intimate physical and electrical contact with said surface and with said lead, said lead being selected for the metal from which said salt is derived or a noble metal.

4. Process for making an electrode structure for measuring concentration of an ionic species in aqueous solution, said process comprising the steps of:
    melting a quantity of material selected from the salts of silver and thallium, and which has normally solid state in which said material is ionic;
    placing the molten material as a mass between and in intimate physical contact with an electrically-conductive metallic lead selected from the metal from which said salt is derived or a noble metal and a surface of a membrane of glass sensitive to said ionic species in said aqueous solution; and
    cooling said mass to a solid state while in said contact.

5. Process for making an electrode structure for measuring concentration of an ionic species in aqueous solution, said process comprising the steps of:
    melting a quantity of material selected from the salts of silver and thallium, and which has a normally solid state in which said material is ionic;
    placing said molten mass in physical contact with a surface of a membrane of glass sensitive to said ionic species in said aqueous solution;
    contacting said molten mass with an electrically conductive, metallic lead selected from the metal from which said salt is derived or a noble metal; and
    cooling said mass to its solid state while in contact with both said surface and said lead.

6. Process for making an electrode structure for measuring concentration of an ionic species in aqueous solution, said process comprising the steps of:
    preparing a tube of glass sensitive to said ionic species in said aqueous solution having an electrically conductive lead disposed within said tube and a quantity of normally solid, ionic material selected from the salts of silver and thallium, and disposed between at least a portion of said lead and a portion of the interior wall of said tube, said lead being selected from the metal from which said salt is derived or a noble metal;
    heating said material to form a continuous molten mass in physical contact with both said portions of said lead and wall;
    heating said tube at a location adjacent said material to render said glass workable;
    drawing the heated tube to reduce at least the external diameter thereof at said location;
    dividing said tube transversaly at the reduced portion thereof to form at least one tube part having said lead and molten material therein;
    sealing with glass the divided end of said tube part; and
    cooling said tube part to solidify said molten material in intimate physical and electrical contact with both said lead and said wall.

7. Process for making an electrode structure for measuring concentration of an ionic species in aqueous solution, said process comprising the steps of:
    melting a quantity of a silver salt;

placing the molten silver salt as an integral mass between and in intimate physical contact with an electrically-conductive metallic lead of silver or a noble metal, and a surface of a membrane of glass sensitive to said ionic species in said aqueous solution; and
cooling said mass to a solid state while in said contact.

8. Process for making an electrode structure for measuring concentration of an ionic species in aqueous solution, said process comprising the steps of:
  melting a quantity of silver chloride;
  placing the molten silver chloride as an integral mass between and in intimate physical contact with an electrically-conductive metallic lead of silver or a noble metal, and a surface of a membrane of glass sensitive to said ionic species in said aqueous solution; and
  cooling said mass to a solid state while in said contact.

9. An electrode structure for measuring concentration of an ionic species in aqueous solution, said structure comprising, in combination:
  a membrane of glass sensitive to said ionic species in said aqueous solution;
  an electrically-conductive lead of silver or a noble metal spaced from surface of said membrane; and
  a solid fused integral mass of a silver salt in intimate physical and electrical contact with both said surface and said lead.

10. An electrode structure for measuring concentration of an ionic species in aqueous solution, said structure comprising, in combination:
  a membrane of glass sensitive to said ionic species in said aqueous solution;
  an electrically-conductive lead of silver or a noble metal spaced from surface of said membrane; and
  a solid fused integral mass of silver chloride in intimate physical and electrical contact with both said surface and said lead.

References Cited by the Examiner

UNITED STATES PATENTS

| | | | |
|---|---|---|---|
| 2,117,596 | 5/1938 | Bender et al. | 204—195 |
| 2,672,441 | 3/1954 | White | 204—195 |
| 2,697,070 | 12/1954 | Arthur | 204—195 |
| 2,930,967 | 3/1960 | Laird et al. | 204—195 |
| 2,977,293 | 3/1961 | Ingold | 204—1 |

FOREIGN PATENTS

| | | |
|---|---|---|
| 492,936 | 9/1938 | Great Britain. |
| 495,303 | 11/1938 | Great Britain. |

OTHER REFERENCES

Taylor: "Proceedings of the Society for Experimental Biology and Medicine," vol. 23 (1925–6), pp. 147 and 148.

Ives et al.: "Reference Electrodes," (1961), pp. 258, 470 and 471.

Ives et al.: "Reference Electrode," (1961), pp. 527, 540, 553 and 554, QD 571 I88.

JOHN H. MACK, *Primary Examiner.*

T. TUNG, *Assistant Examiner.*